United States Patent [19]
Shafer

[11] Patent Number: 5,841,483
[45] Date of Patent: Nov. 24, 1998

[54] USE OF AN AUDIO PROCESSING CHANNEL IN A TELEVISION RECEIVER DURING A MULTIPICTURE MODE OF OPERATION

[75] Inventor: Kirk Edward Shafer, Carmel, Ind.

[73] Assignee: Thomson Consumer Electronics, Inc., Indianapolis, Ind.

[21] Appl. No.: 855,609

[22] Filed: May 13, 1997

Related U.S. Application Data

[60] Continuation of Ser. No. 667,514, Apr. 4, 1996, abandoned, which is a division of Ser. No. 328,674, Oct. 25, 1994, abandoned.

[51] Int. Cl.$^6$ ............................................. H04N 5/45
[52] U.S. Cl. ............................................. 348/565; 348/588
[58] Field of Search ................................. 348/565, 564, 348/570, 585, 553, 731, 705, 738, 588; H04N 5/45

[56] References Cited

U.S. PATENT DOCUMENTS

| 4,845,564 | 7/1989 | Kakamada et al. ..................... 358/183 |
| 4,903,129 | 2/1990 | Bell et al. .............................. 358/181 |
| 5,194,954 | 3/1993 | Duffield ............................... 358/193.1 |
| 5,237,418 | 8/1993 | Kaneko ................................... 358/183 |
| 5,296,918 | 3/1994 | Kim ........................................ 348/568 |
| 5,414,471 | 5/1995 | Saitoh et al. ........................... 348/565 |
| 5,434,626 | 7/1995 | Hayashi et al. ......................... 348/565 |

FOREIGN PATENT DOCUMENTS

| 0376376 | 7/1990 | European Pat. Off. ......... H04N 5/45 |
| 0486987 | 5/1992 | European Pat. Off. ....... H04N 5/445 |
| 0557033 | 8/1993 | European Pat. Off. ......... H04N 5/45 |
| 4121314A1 | 1/1992 | Germany ......................... H04N 5/45 |
| 57-63981 | 4/1982 | Japan .............................. H04N 9/02 |
| 1-126083 | 5/1989 | Japan .............................. H04N 5/60 |
| 2220543 | 1/1990 | United Kingdom ............. H04N 5/45 |
| 2260873 | 4/1993 | United Kingdom ............. H04N 5/45 |
| 2275585 | 8/1994 | United Kingdom ............. H04N 5/45 |

Primary Examiner—Victor R. Kostak
Attorney, Agent, or Firm—Joseph S. Tripoli; Peter M. Emanuel; Robert D. Shedd

[57] ABSTRACT

A television receiver comprises a graphics generator, a video processor, an audio processor, a picture-in-picture processor, and a controller for producing a display of an array of inset images. The controller causes one inset image of the array of inset images to be displayed with an associated graphics image to indicate selection of the one inset image, and causes the reproduction of the audio signal associated with said selected inset image. In one embodiment, all images except the selected one are "frozen", and the selected image is updated in near real time. In another embodiment, a second tuner is tuned to the selected-image channel and is used to provide audio for the selected image, while the first tuner continues to sequentially tune the channels from which all of the images are derived.

5 Claims, 3 Drawing Sheets

USE OF AN AUDIO PROCESSING CHANNEL IN A TELEVISION RECEIVER DURING A MULTIPICTURE MODE OF OPERATION

This is a continuation of application Ser. No. 667,514, filed Apr. 4, 1996, now abandoned, which is continuation of application Ser. No. 328,674, filed Oct. 25, 1994 now abandoned.

FIELD OF THE INVENTION

The subject invention generally concerns "multipix" displays for electronics equipment, such as, television receivers, and specifically relates to a novel use for the audio channel during such a multipix display.

BACKGROUND OF THE INVENTION

Multipix displays comprising an array of inset images are well-known in the television art. For example, a television receiver having multiplex capability is the RCA CTC-172, manufactured by Thomson Consumer Electronics, Inc., Indianapolis, Ind. A viewer can call up such a multipix display and can see samples of television programs from a number (usually 12) of channels, simultaneously. The CTC-172 also has the capability of highlighting a particular inset image to indicate its selection by a user, and then leaving the multipix mode to tune the selected channel. In such multipix receivers, the tuner is repeatedly and sequentially tuned to each of the source channels in order to update each of the inset images. In a perfect world this updating procedure would occur so quickly that the user would be totally unaware that he was viewing samples of each channel. Unfortunately, tuning to each channel and obtaining the video signal sample takes an amount of time which is readily observable to the user. That is, it may take several seconds before the tuner gets around to updating a particular image of an array of twelve inset images. One may also like to hear the sound associated with the selected channel, but due to the relatively slow update speed, this was heretofore impossible.

SUMMARY OF THE INVENTION

A television receiver comprises a graphics generator, a video processor, an audio processor, a picture-in-picture processor, and a controller for producing a display of an array of inset images. The controller causes one inset image of the array of inset images to be displayed with an associated graphics image to indicate selection of the one inset image, and causes the reproduction of the audio signal associated with said selected inset image. In one embodiment, all images except the selected one are "frozen", and the selected image is updated in near real time. In another embodiment, a second tuner is tuned to the selected-image channel and is used to provide audio for the selected image, while the first tuner continues to sequentially tune the channels from which all of the images are derived.

DETAILED DESCRIPTION OF THE DRAWING

Figure 1:
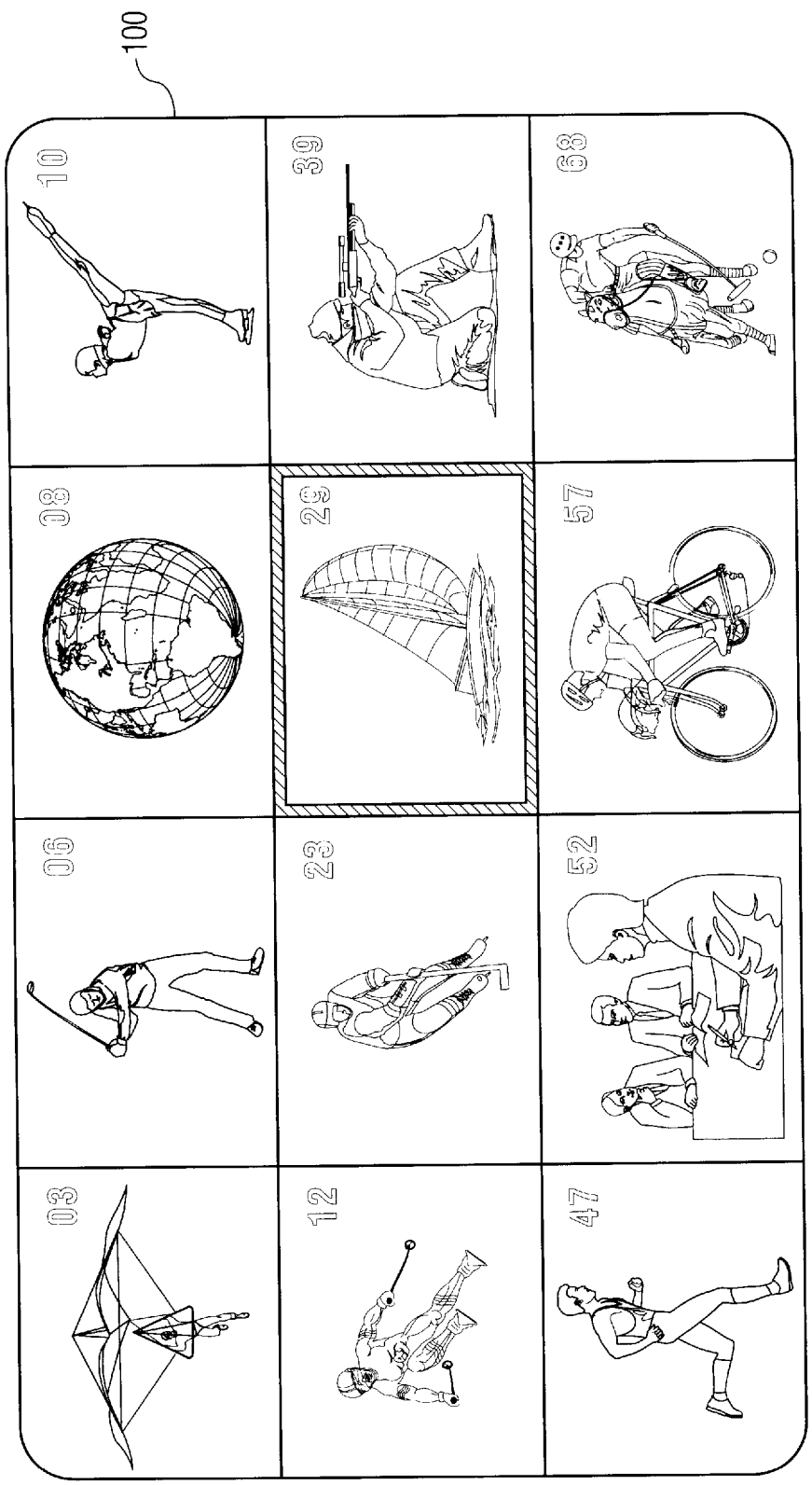
FIG. 1 shows a screen display comprising a multipicture display.
Figure 3:
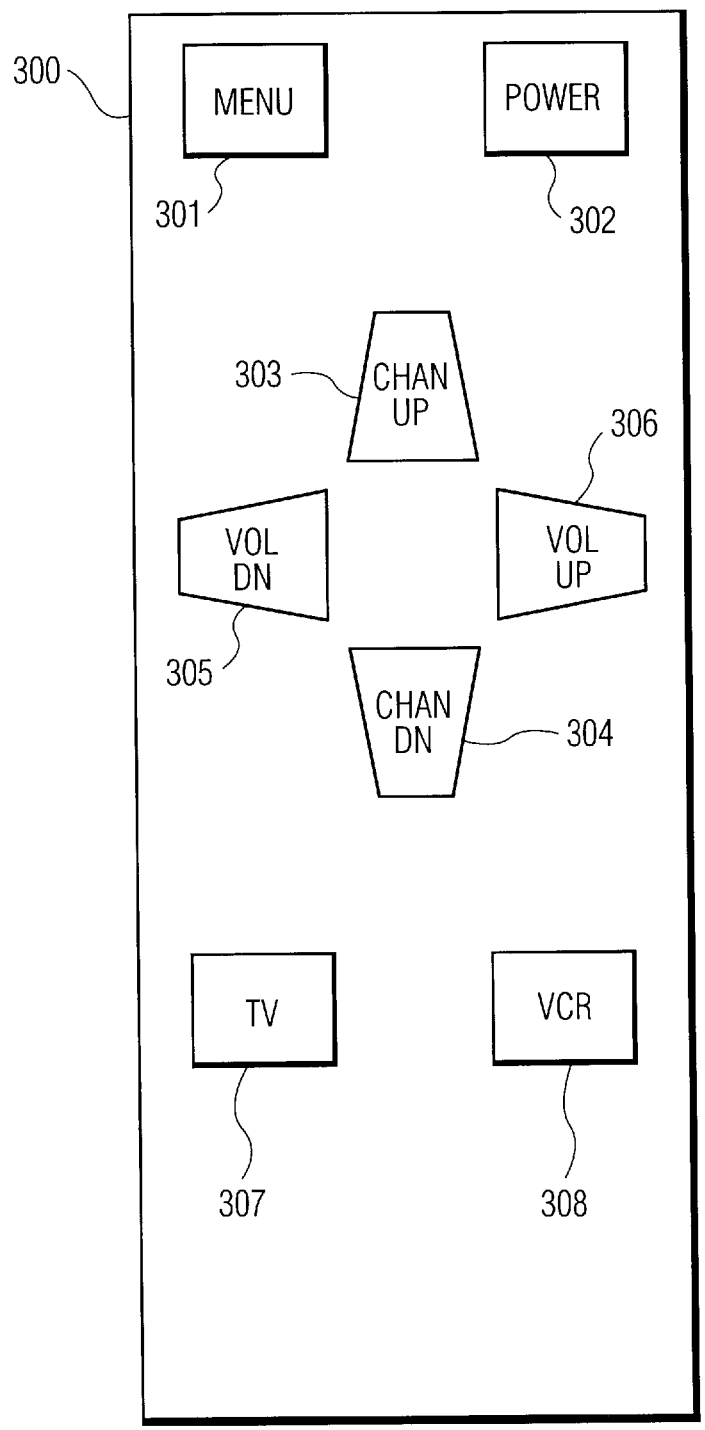
FIG. 3 is a simplified drawing of a remote control unit suitable for use with the invention.

Referring to FIG. 1, a twelve picture multipix array is displayed on a screen 100 of a television receiver. A graphical highlight is a shown forming a border around the inset image bearing the channel number 29. The graphical border can be moved from inset to inset by means of cursor keys of a remote control unit 300 of FIG. 3. During the time that the inset array is displayed, CHAN UP, CHAN DN, VOL UP, and VOL keys 303, 304, 305, and 306 are no longer used to change channels or for volume control, but rather are used as X and Y-direction cursor control keys for use by the viewer to "navigate" through the array.

A user operates cursor keys 303–306 to highlight an inset image, and then presses MENU key 901 to accomplish the selection of that particular inset image for tuning. In accordance with the subject invention, highlighting an inset image also causes the reproduction of the audio associated with the channel from which that inset was derived. There are two applications for this concept. In the first, the tuner is commanded to stop sequentially tuning channels for video sample updating, and to tune instead to the channel associated with the selected inset image. All other channel samples are "frozen", by virtue of the fact that they are not being updated, but the selected inset can be updated at a much faster rate, near real time. The audio can be used from the tuner because it is continuously tuned to the same channel in this mode of operation. It is probable that something of interest on the selected inset caught the viewers eye, and caused him to make that particular selection. The result is that the viewer can see a frozen snapshot of what is on all channels and can focus his attention on the near real time updated video and continuous audio of the selected inset image.

In the second application, a two tuner television receiver uses one tuner for repeatedly and sequentially updating the array of inset images, and uses the second tuner to tune continuously to the selected channel from which the selected inset image is derived. The result in this case is that the viewer can see a continual updates of what is on all channels, but can nevertheless focus his attention on the video and audio of the selected inset image.

Figure 2:
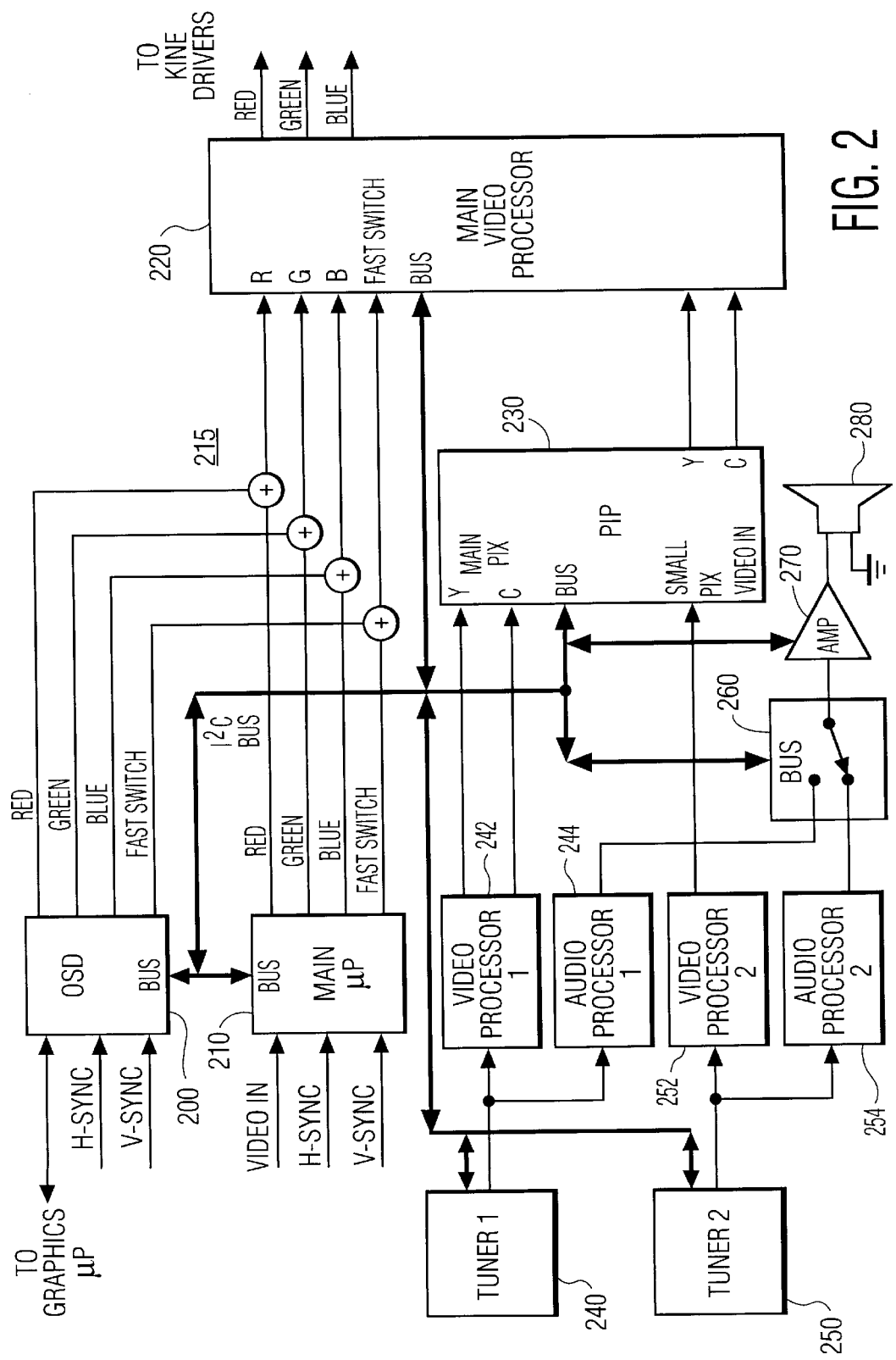
FIG. 2 shows, in block diagram form, the relevant portion of the circuitry of a television receiver operating in accordance with the invention.

FIG. 2 shows a simplified block diagram of that section of the receiver which provides the above-described screen display and audio capability. OSD (On Screen Display) Processor 200 is preferably a bit-mapped graphics generator for creating the graphics borders around the highlighted inset images, under control of a Main Microprocessor 210. OSD Processor 200 produces image signals at Red, Green, and Blue color signal output terminals. Main Microprocessor 210 also receives a video signal from the television chassis and derives closed caption information therefrom. It produces closed caption display signals at Red, Green, and Blue color signal output terminals. The outputs of OSD Processor 200 and of Main Microprocessor 210 are summed together in an array of summing circuits, generally designated 215. These summing circuits may comprise, for example, the well-known non-additive mixer circuit, which has the property that it will pass the greater of the two signals at its inputs while blocking the lesser of the two input signals. The outputs of the summing circuits are applied to a MAIN VIDEO PROCESSOR unit 220 which also receives Y (luminance) and C (chrominance) component video signals from a PIP unit 230. The input signals for PIP unit 230 are provided by a first tuner 240, a first video processor 242, a second tuner 250, and a second video processor 252. A FAST SWITCH signal generated by either OSD Processor 200 or Main Microprocessor 210 causes the graphics signal (or closed caption signal ) to be substituted for the video signal for the duration of the fast switching signal. Tuner 240 and tuner 250 also provide signals to a pair of audio processors 244 and 254. Audio processors 244 and 254 provide signals to an audio switching arrangement 260 operating under control of main microprocessor 210. The selected audio signal is applied to an audio amplifier 270 and to a speaker 280 (the audio channel is shown monophonic for simplicity, but stereophonic is not precluded.)

A one tuner embodiment would include all elements of FIG. 2 except tuner 240, video processor 242, audio processor 244, and audio switch 260. In operation of the one tuner embodiment, Main Microprocessor (i.e., system controller) 210 operating under control of its own software causes PIP unit 230 to automatically display a graphics border drawn by OSD processor 200 around the exact location of the PIP inset corresponding to the user's selection, and controls tuner 250 to stop sequentially tuning, and to tune continuously to the channel from which the selected inset image is derived. When tuner 250 has completed tuning that channel, the output of audio processor 254 is applied to amplifier 270 for audio reproduction in speaker 280. Audio amplifier is also controllable to turn on and off by main microprocessor 210 via the internal bus.

In operation of the two tuner embodiment, Main Microprocessor (i.e., system controller) 210 operating under control of its own software causes PIP unit 230 to automatically display a graphics border drawn by OSD processor 200 around the exact location of the PIP inset corresponding to the user's selection, and controls tuner 240 to tune to the channel from which the selected inset image is derived. When tuner 240 has completed tuning that channel, audio switch 260 is caused to select the output of audio processor 244 and apply it to amplifier 270 for audio reproduction in speaker 280. Audio amplifier is also controllable to turn on and off by main microprocessor 210 via the internal bus. As a further advantage, it is noted that faster tuning of the selected channel can be accomplished because the second tuner is already tuned to the selected channel.

The phrases "system controller" and main microprocessor are used interchangeably herein and are intended to also encompass microcomputers and dedicated custom integrated circuits. The term "television receiver" is intended to encompass television receivers having a display device (commonly called TV sets) and television receivers not having a display device (such as VCRs).

What is claimed is:

1. A television receiver, comprising:

only one tuner for tuning television channels in a repeating sequence for providing recurring samples of video signals at different television channels;

an audio processor for processing audio signals received from said tuner;

a video processor for processing a video signal received from said tuner;

picture-in-picture processor coupled to said video processor and deriving a signal from said video signal for producing an inset image;

a second video processor coupled to said picture-in-picture processor for producing a combined signal which when displayed comprises a video image of an array of inset images sampled from said different television channels; and control means for controlling said tuner, said second video processor, and said picture-in-picture processor to produce said combined image;

said control means selecting one inset image of said array of inset images in response to an input of a user causing said tuner to cease updating samples of non-selected inset images, and to tune to the channel of said selected inset image and controlling said audio processor to reproduce an audio signal associated with said selected inset image while continuing to display said non-selected inset images along with said selected inset image.

2. The television receiver of claim 1, comprising:

graphics generation means for generating a signal for display, said signal being indicative of the selection of said selected inset image of said array of inset images.

3. The television receiver of claim 2, further comprising data entry means for use by said user for entering said data to specify a screen location at which said graphics generation means causes said signal indicative signal to be displayed.

4. The television receiver of claim 3, wherein said data entry means is keyboard of a remote control unit, and said location data is cursor direction data and channel up, channel down, volume up and volume down keys of said data entry means.

5. The television receiver of claim 4, wherein said non-selected inset images are displayed in a frozen in time mode, and said selected inset image is displayed in near real time.

* * * * *